United States Patent [19]

Fortunati et al.

[11] Patent Number: 5,369,091

[45] Date of Patent: Nov. 29, 1994

[54] PROCESS FOR THE MANUFACTURE OF 95% BY WEIGHT SINGLE PHASE YCBO POWDER IN ONE COMBUSTION STEP, COMPRISING THE USE OF CITRATE COMPLEX COMPOUNDS AS STARTING MATERIALS

[75] Inventors: Stefano Fortunati, Ardea; Mario Tului, Rome; Luca Risso, Genoa, all of Italy

[73] Assignee: Centro Sviluppo Material S.p.A., Rome, Italy

[21] Appl. No.: 200,535

[22] Filed: Feb. 22, 1994

Related U.S. Application Data

[63] Continuation of Ser. No. 915/137, Jul. 20, 1992, abandoned.

[30] Foreign Application Priority Data

Jul. 23, 1991 [IT] Italy .................. RM91A000555

[51] Int. Cl.$^5$ ................ H01B 12/00; H01L 39/12
[52] U.S. Cl. ................... 505/445; 252/521; 505/780; 505/481
[58] Field of Search ............. 505/780; 252/521

[56] References Cited

U.S. PATENT DOCUMENTS

| | | | |
|---|---|---|---|
| 4,751,070 | 6/1988 | Pai Verneker | 423/592 |
| 4,764,357 | 8/1988 | Sherif et al. | 423/338 |
| 4,839,339 | 6/1989 | Bunker et al. | 505/1 |
| 4,900,715 | 2/1990 | Cooper et al. | 505/1 |
| 4,996,189 | 2/1991 | Kourtakis et al. | 505/1 |
| 5,066,636 | 11/1991 | Liu et al. | 501/1 |
| 5,114,702 | 5/1992 | Pederson et al. | 423/639 |
| 5,162,299 | 11/1992 | Pastor et al. | 505/1 |
| 5,182,255 | 1/1993 | Budd | 501/1 |

FOREIGN PATENT DOCUMENTS 0385453 9/1990 European Pat. Off. .

OTHER PUBLICATIONS

Letter to the Editor, Preparation of YBa$_2$Cu$_3$O$_{7-\delta}$ by citrate synthesis and pyrolysis, D H A Blank et al., pp. 226–227, copyrighted 1988, IOP Pub. Ltd.

Applied Physics Letters, Pyrophoric synthesis technique for multicomponent high-temperature superconductors, Bhattacharya et al., pp. 2145–2147, Nov. 12, 1990, No. 20, New York.

DataBase WPIL—Derwent Publications Ltd. London, GB; AN 90-030188/04 and U.S. Appln. 07/146,640, Nigrey (Abstract only).

Rambabu, "An Efficient Combustion Process for Synthesis of YBa$_2$Cu$_3$O$_7$," *J.J.A.P.* vol. 29, No. 3, Mar. 1990, pp. 507–508.

Baythoun et al., "Production of Strontium-Substituted Lanthanun Manganite Perovskit Powder by the Amorphous Citrate Process," *Journal of Materials Science* 17 (1982) pp. 2757–2769.

Varma et al., "Metal Nitrate–Urea Decomposition Route for Y–Ba–Cu–O Powder." *J. Am. Ceram. Soc.*, 73 (10), pp. 3103–3105 (1990).

Anderton et al., "Production of conducting oxide powders by amorphous citrate process," *Powder Metallurgy* 1979 No. 1, pp. 14–21.

Laboratori Nazionali di Frascati, F. Celani et al. Pyrolytic Citrate Synthesis and Ozone Annealing: Two Key Steps Toward The Optimization of Sintered YBCO, Nov. 8, 1992, pp. 1–8.

*Primary Examiner*—Donald F. Walsh
*Assistant Examiner*—Anthony R. Chi
*Attorney, Agent, or Firm*—Oliff & Berridge

[57] ABSTRACT

A process for producing YBCO powders by pyrolysis involves preparing a clear aqueous solution containing the ions yttrium, barium and copper, in the final proportions desired for the powder, in the form of complex compounds, preferably citric complex compounds, and in the presence of a detonating system such as a combination of ammonium ions and nitrate ions. The clear solution is then concentrated by evaporation, until a violent combustion is triggered which is carried out at a high temperature, higher than 250° C. and preferably higher than 850° C.

19 Claims, No Drawings

PROCESS FOR THE MANUFACTURE OF 95% BY WEIGHT SINGLE PHASE YCBO POWDER IN ONE COMBUSTION STEP, COMPRISING THE USE OF CITRATE COMPLEX COMPOUNDS AS STARTING MATERIALS

This is a continuation of application Ser. No. 07/915,137 filed Jul. 20, 1992, now abandoned.

BACKGROUND OF THE INVENTION

1. FIELD OF THE INVENTION

The instant invention relates to a process for the manufacture of powders for superconductive ceramic materials.

In particular, the invention relates to the manufacture of powders of superconductive ceramic oxides of the type $Y_1Ba_2Cu_3O_{7-x}$ (YBCO), x being between 0 and 1, bounds included, by means of the pyrolysis of a solution containing the ions of the metals forming the same oxides.

2. THE PRIOR ART

It is known that ceramic materials, like the ones belonging to the class of the complex oxides such as YBCO, can show superconductivity at a temperature higher than that of liquid nitrogen.

Such a feature is considerably interesting, from a practical/applicatory point of view, but the interest is tempered and restrained either by the poor availability of oxides showing suitable features or by the high manufacturing cost of such oxides.

Particularly important, and obtainable with difficulty, is the combination of homogeneity and fine granulometry of the starting powders of such oxides, which have to subsequently undergo compacting (hot-pressing) and syntering.

In the case of YBCO, the most commonly used methods, exploiting the solid-state reaction of a mixture of copper oxide, yttrium oxide and barium carbonate, exhibit a drawback because it is very unlikely that a single-phase compound can be obtained by means of only one thermal treatment (at high temperature) and high amounts of barium carbonate thus remain unreacted. That's why further onerous annealing treatments are required, which treatments cause an undesired agglomeration of the powders. The agglomerated powders must then undergo a grinding. In particular, in the case of YBCO, the grinding cannot be wet-ground in water, but only in the presence of an organic solvent, which obviously involves further costs and problems.

Therefore, the preliminary techniques described hereinabove are considered particularly unfavourable.

The chemical methods for the manufacture of the powders are for instance the sol-gel method, coprecipitation, and pyrolysis. Such methods are more reliable and give rise to powders having a homogeneous composition and a fine granulometry, but they are complex, critical and expensive in the peculiar case of YBCO. In particular, the pyrolysis method for the manufacture of YBCO, as described for instance on Nov. 8, 1988 by F. Celani et al., in the report 88/62(P) of the Ist. Naz. di Fisica Nucleare (Lab.Naz.Frascati) entitled "PYROLYTIC CITRATE SYNTHESIS AND OZONE ANNEALING. TWO KEY STEPS TOWARD THE OPTIMIZATION OF SYNTERED YBCO", gives rise to such a low yield that industrialization of this process is not justified.

The pyrolysis method described hereinabove is based on the combustion of a solution of citrates of the metals building up the YBCO, said solution being made flammable by the presence of ammonium nitrate. Such a method imparts to the dry pyrolysis residue the same microscopic homogeneity that is typical of the starting solution, provided that the solution is clear without showing any suspended body. The reaching of such a condition is, however, critical and can be reproduced only with difficulty.

Moreover, the thus obtained powders are not single-phase and must undergo long (tens of hours), critical (because of powder agglomeration) thermal post-treatments, in order to attain single-phase features.

The Applicant found that by working in a specific way and by a strict control of the operative conditions, the drawbacks described hereinabove can be overcome, thus obtaining a highly satisfactory reproducibility and a constant quality of the oxides, in terms of homogeneity of the composition and of granulometry.

SUMMARY OF THE INVENTION

It is therefore a purpose of the present invention to manufacture powders of superconductive oxides like YBCO in such a way that the solution, containing the metals forming the oxide, is clear. Another purpose of the invention is to provide an improved process for the pyrolysis of said clear solution.

Further purposes of the invention will be pointed out by the following disclosure of the invention.

DISCLOSURE OF THE INVENTION

According to the present invention, the process for the production of YBCO powders by pyrolysis is characterized by the preparation of a clear aqueous solution containing the ions yttrium, barium and copper, in the final proportions desired for the powder, in the form of complex compounds, preferably complex citric compounds, and in the presence of a detonating system, such as a combination of ammonium ions and nitrate ions.

The clear solution is then concentrated by means of evaporation, until triggering a violent combustion. The resulting combustion product is them maintained at a high temperature, higher than 250° C. and preferably higher than 850° C., to form the YBCO powder.

A very satisfactory temperature range is between 870° and 1000° C. Particularly advantageous pyrolysis conditions are a temperature of 870°-980° C. for a time of from 60 to 360 s.

Temperatures over 1000° C. are useless, as the amount of YCBO phase formed doesn't appreciably increase. Furthermore, temperature over 1000° C. not advisable because they promote the agglomeration of the powder, thus reducing its specific surface.

Temperatures below 850° C. give rise to an intimate YBCO mixture, with the presence of spurious phases, which is excellent as to the powder homogeneity but requires successive long thermal annealing post-treatments.

If the clear solution containing Y, Ba and Cu is directly concentrated and pyrolysed at a temperature higher than 850° C., a nearly single-phase YBCO powder is obtained in an extremely short treatment time. 60 s, at 900° C., can be a sufficient time for imparting to the powders a single-phase feature equal to 95% by volume.

A particularly advantageous operative condition resides in that the clear solution is pyrolised in the form of a thin layer, having for instance a thickness of the order of 100 μm on a suitable carrier.

The carrier on which the pyrolysis is carried out can be a metal conveyor belt, optionally surface treated with a coating resistant to the high temperatures and inert with respect to the solution of metal ions.

The thermal treatment of the thin layer solution, consisting of the evaporation and of the triggering of the combustion, gives rise to a flame having a duration which is not particularly critical. However, a too fast combustion causes undesired discharge of materials, whereas a too slow combustion can lead to an undesired phase separation.

Typically, the times concerning the combustion will be of the order of 1–10 s.

After the combustion, the temperature is steadily kept at a level higher than 850° C. A very favourable temperature range is 870°–1000° C. Particularly advantageous conditions are represented by a temperature of 870°–980° C. for a time of 60–360 s.

The subsequent cooling step, of the formed YBCO powder, is not critical. In order to obtain a constant quality of the YBCO powders, as already mentioned, it is essential that the solution containing the metal ions be clear and free from any suspended body.

Particularly preferred, for the purposes of the invention, is the preparation of a clear aqueous solution containing the yttrium, barium and copper ions, in the final proportions desired for the powder, in the form of complex citric compounds and in the presence of a detonating system containing ammonium nitrate.

In order to obtain all this it is advisable to work as follows. The starting copper, yttrium and barium compounds, previously dried at approximately 110° C. to a constant weight, are provided in a stoichiometrical amount so as to have the Y, Ba and Cu cations, when dissolved, in a final ratio of the YBCO equal to 1:2:3. The compounds are then placed into solution.

A suitable operative way to place the compounds into solution is to use nitric acid for the dissolving step.

The amount of nitrate ions in the solution, cannot be too high, as the combination with ammonia, which is subsequently added to create the detonating system, leads to the formation of ammonium nitrate, which is one of the elements for managing the combustion strength.

It is therefore necessary to meter the amounts of nitrate ions and ammonia in such a way that the operative conditions of the pyrolysis are achieved as described hereinabove.

In order to prepare the solution, the temperatures can be in the range of from 80° to 90° C. Optimum reaction levels are obtainable starting from a final solution containing about 100 potential grams of YBCO in a the liquid volume of 1 liter. A complexing agent like citric acid, acting as a combustion moderator, is then added to the solution. It is desirable that the ratio of citric acid-/ammonium nitrate be kept in the range of from 1:2 to 1:5. At this point the solution is reasonably acid.

Finally, $NH_4OH$ is added and the solution typically takes on a dark blue colouring. In practice, such colouring can be used as an indicator for the reaching of the final pH, desired for the solution, which has to be higher than 6.5 and preferably higher than 6.8. A particularly preferred pH range is from 7.0 to 7.5.

It was found that the obtaining of a clear solution is bound due to the combination of two technical expedients: a careful control of the pH of the solution and contemporaneously an addition of ammonia to be carried out in as short a time as possible consistent with the operative conditions needed to prepare the solution. In the case of a discontinuous manufacture of small amounts of YBCO, ammonia will be added as $NH_4OH$ at a rate of from 0.3 to 1 l/s of 25% b.w. $NH_4OH$ solution when the volume of the solution of Y, Ba and Cu is approximately comprised between 6 and 10 l.

In the case of a continuous manufacture of YBCO, the operative conditions, fop the ammonia addition, will be optimized according to the concept of the invention.

The subsequent pyrolysis thermal treating at a high temperature, performed as above, allows one to obtain a powder containing an overall amount of carbon that is very restrained and surely reduced with respect to traditional technologies.

The undeniable advantage of the disclosed method resides in the possibility of obtaining formed YBCO in a much shorter time, compared to the times of the known art, thus making the pyrolysis method readily industrializable.

By the process according to the invention, the manufactured YBCO powders are characterized by a purity level higher than 95%, with the presence of traces of minor phases which cannot be detected with the usual X-ray diffraction techniques.

The powders obtained following the process according to the invention, because of the extremely low density of the reaction product, can be morphologically compared to a very light sponge and therefore exhibit a high reactive surface and contemporaneously a high homogeneity of the composition, with respect to the partition of the cations present in the starting solution, the solution stoichiometry of said cations being strictly observed.

In view of the above, the advantages of the disclosed method may be hence summarized as:
  a high productivity;
  a low manufacturing cost;
  the possibility of obtaining a product that is not a precursor based on oxides and carbonates, but rather is directly formed as YBCO, (single-phase for at least 95% b.w.) and containing an overall amount of carbon lower than 0.2% b.w.

The following example is supplied for illustrative purposes and shall not be construed as to limit the invention's scope.

EXAMPLE

An acid solution, containing nitrate ions and the ions Y, Ba and Cu in the ratio 1:2:3 respectively, is prepared in such a way that the ratio between the solution volume and the Y moles is approximately 1400 g of citric acid monohydrate, pep mole of Y, are added under stirring by heating at approximately 60° C. in order to promote the dissolving. The ratio of citric acid/ammonium nitrate is ca. 1:3. There are eventually added 2500 $cm^3$ of a 25% b.w. $NH_4OH$ solution per mole of formed Y, with an addition rate of from about 0.3 to 1 l/s, making sure the final pH is alkaline. If the pH is below the recommended range, the pH can be adjusted by addition of further ammonia.

A layer of about 100 μm of the thus prepared solution is spread over a conveyor belt and subjected to pyrolysis in an oven in the following way. Within a time of 3 s the solution layer is brought to a temperature of 900° C. and maintained at such a temperature for 150 s. The thus obtained powder is then cooled down spontaneously, resulting in a very fine, non-agglomerated powder. Such powder consists of practically single-phase YBCO (absence of second phases under X-ray analysis).

We claim:

1. A process for producing a YBCO powder, comprising providing a clear aqueous solution containing the ions yttrium, barium and copper, in the final proportions desired for the powder, in the form of citrate complex compounds and in the presence of a detonating system comprising a combination of ammonium ions and nitrate ions, said detonating system being formed by adding $NH_4OH$ to the solution at a rate and in a total amount such that the solution remains free of suspended bodies, concentrating the solution by evaporation until triggering a violent combustion that lasts about 1 to 10 seconds to form a combustion product, and keeping the combustion product at a temperature higher than 850° C. for about 60 to 360 seconds to form a superconductive YBCO powder that is at least 95% by weight single-phase.

2. A process according to claim 1, wherein the complex compounds are citric complex compounds.

3. A process according to claim 1, wherein the combustion product is kept, after said combustion, at a temperature of 870°–1000° C.

4. A process according to claim 1, wherein the combustion product is kept, after the combustion, at a temperature of 870°–980° C. for a time of from 60 to 360 s.

5. A process for producing a YBCO powder, comprising providing a clear aqueous solution containing the ions yttrium, barium and copper, in the final proportions desired for the powder, in the form of citrate complex compounds and in the presence of a detonating system comprising a combination of ammonium ions and nitrate ions, said detonating system being formed by adding $NH_4OH$ to the solution at a rate and in a total amount such that the solution remains free of suspended bodies, spreading the solution as a thin layer over a carrier, concentrating the solution by evaporation to trigger a combustion of the solution that lasts about 1 to 10 seconds to form a combustion product, and keeping the combustion product at a temperature higher than 850° C for about 60 to 360 seconds to form a superconductive YBCO powder that is at least 95% by weight single-phase.

6. A process according to claim 5, wherein the carrier on which the pyrolysis occurs is a metal conveyor belt.

7. A process according to claim 5, wherein the thickness of the thin layer is of the about 100 μm.

8. A process according to claim 5, wherein the complex compounds are citric complex compounds.

9. A process according to claim 5, wherein the complex compounds are obtained by adding citric acid to the solution, wherein the detonating system contains ammonium nitrate and wherein the ratio of citric acid:ammonium nitrate is from 1:2 to 1:5.

10. A process according to claim 5, wherein the combustion product is kept, after the combustion, at a temperature of 870°–1000° C.

11. A process according to claim 5, wherein the combustion product is kept, after the combustion, at a temperature of 870°–980° C. for a time of from 60 to 360 s.

12. A process for manufacturing YBCO powders, comprising:
(i) drying starting compounds comprising citrate complex forming compounds selected from the group consisting of yttrium, barium and copper at approximately 110° C. until the compounds reach a constant weight, providing stoichiometrical amounts of the cations Y, Ba and Cu in a final YBCO ratio equal to 1:2:3, providing a solution containing the compounds by dissolving the compounds in the presence of nitrate ions under acidic conditions;
(ii) adding a complexing agent to the solution;
(iii) adding $NH_4OH$ to the solution at a rate and in a total amount such that the solution remains free of suspended bodies and the final pH of the solution is higher than 6.5; and
(iv) concentrating the solution by evaporation to trigger a combustion of the solution that lasts about 1 to 10 seconds to form a combustion product, and keeping the combustion product at a temperature higher than 850° C. for about 60 to 360 seconds to form a superconductive YBCO powder that is at least 95% by weight single-phase.

13. A process according to claim 12, wherein nitric acid is employed for the dissolving step.

14. A process according to claim 12, wherein, in order to prepare the solution, the working temperatures are about of 80°–90° C.

15. A process according to claim 12, wherein the final pH of the solution is higher than 6.8.

16. A process according to claim 12, wherein the final pH of the solution is from 7.0 to 7.5.

17. A process according to claim 12, wherein the addition of ammonia is carried out by adding a 25% b.w. $NH_4OH$ solution, at a rate of from 0.3 to 1 l/s when the volume of the solution containing Y, Ba and Cu is approximately from 6 to 10.

18. The process according to claim 6, wherein the conveyor belt is treated with a coating resistant to high temperatures.

19. A process for producing a superconductive ceramic oxide powder, comprising:
(a) providing a clear aqueous solution comprising yttrium, barium and copper citrate complex compounds, in amounts to provide yttrium, barium and copper cations in a ratio of 1:2:3 by weight of the final ceramic oxide powder, and nitrate ions;
(b) adding $NH_4OH$ to the solution to form an ammonium nitrate detonating system in the solution, the $NH_4OH$ being added to the solution at a rate and in a total amount such that the solution remains free of suspended bodies;
(c) concentrating the solution by evaporation to trigger a combustion of the solution that lasts about 1 to 10 seconds to form a combustion product; and
(d) maintaining the combustion product at a temperature higher than 850° C. for about 60 to 360 seconds to form a superconductive ceramic oxide powder of the formula $Y_1Ba_2Cu_3O_{7-x}$, wherein x is from 0 to 1, the superconductive ceramic oxide powder being greater than 95% by weight single-phase.

* * * * *